United States Patent [19]

Shuler et al.

[11] 4,090,407
[45] May 23, 1978

[54] WATER LEVEL MEASUREMENT DEVICE

[75] Inventors: Cobia B. Shuler, North Charleston; Wesley E. Moore, Jr., Summerville, both of S.C.

[73] Assignees: T. W. Salisbury, III; Gayle F. Ellis, both of Charleston, S.C.

[21] Appl. No.: 834,690

[22] Filed: Sep. 19, 1977

[51] Int. Cl.² ............................................. G01F 23/00
[52] U.S. Cl. ................................................... 73/290 V
[58] Field of Search ........................... 73/290 V, 290 R

[56] References Cited
U.S. PATENT DOCUMENTS

| 2,713,263 | 7/1955 | Turner | 73/290 V |
| 3,357,246 | 12/1967 | Stearn et al. | 73/290 V |
| 3,394,589 | 7/1968 | Tomioka | 73/290 V |

Primary Examiner—Donald O. Woodiel
Attorney, Agent, or Firm—Larry Harold Kline

[57] ABSTRACT

A device is disclosed for measuring the level of water comprising a hollow, oblong structure with an open end extended into the water, signal sending and receiving means secured onto the structure, an insert containing a hole secured within the structure, and electronic means connected to the signal sending and receiving means to receive and evaluate technical information in order to determine the level of the water.

10 Claims, 3 Drawing Figures

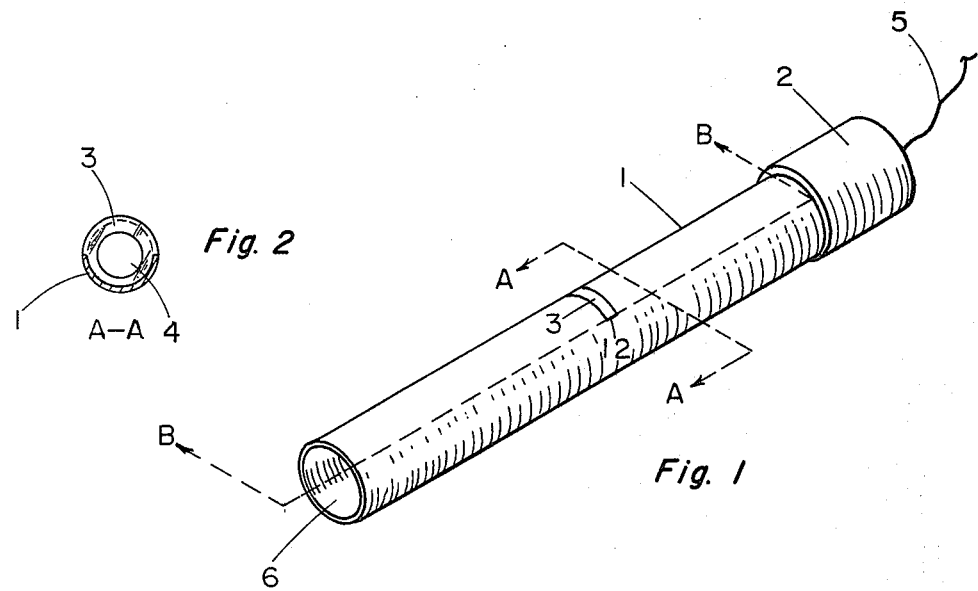
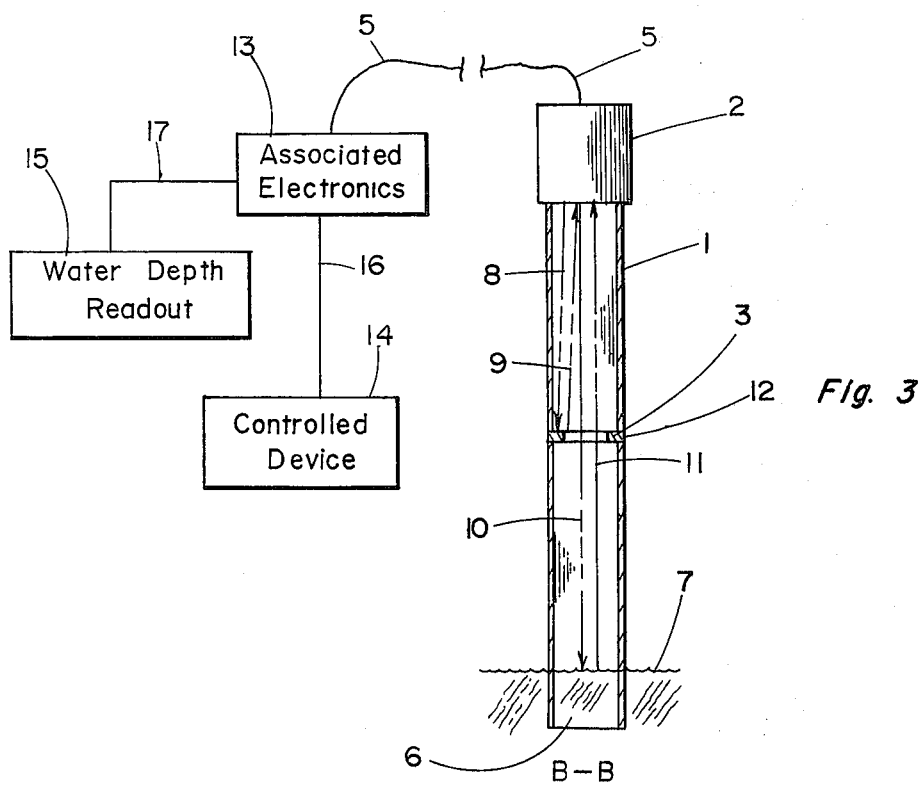

WATER LEVEL MEASUREMENT DEVICE

This invention relates to a water level determining device and more particularly to a device in which the water level can be determined by utilizing electronic and ultrasonic means.

For many purposes, the water level of lakes, ponds, lagoons, reservoirs, or any body of water may need to be known. Various water level measurement techniques, which include mechanical or pneumatic means, have been attempted. Mechanical means have many problems including the possibility of rust or corrosion which may deter the accuracy of the measurement. Pneumatic methods also have many problems including the growth of bacteria or clogging in the pneumatic tubes.

The present invention utilizes a technique of water level measurement including electronic and ultrasonic means. This device solves the problem of variable speed of sound by use of a fixed insert within a hollow, oblong structure which provides a standard by which comparison techniques may determine the accurate level of the water.

An object of the present invention is to provide water level finding means which do not utilize mechanical means which are susceptible to rust and corrosion.

Another object of the present invention is to provide water level finding means which do not utilize pneumatic means.

Still another object of the present invention is to utilize electronic and ultrasonic means to measure the level of water.

A further object of the present invention is to overcome comparison problems which can be caused by variations in the speed of sound due to temperature changes and other factors.

Still another object of the present invention is to simplify electronic circuitry associated with temperature compensation techniques with regard to determination of water level.

A further object of the present invention is to solve the variable speed of sound problem by use of a constant reference insert within the structure utilized for water level finding purposes.

These and other objects and features of the invention will be apparent from the following description and appended claims.

Briefly, the invention is a device for measuring the level of water. The device comprises a hollow, oblong structure with an open end. The structure is secured with the open end in the water. A signal sending and receiving means is secured onto the hollow, oblong structure. An insert containing a hole is secured within the hollow, oblong structure. The insert is operative to reflect a signal from the signal sending and receiving means back to the signal sending and receiving means through the hollow, oblong structure. Portions of the signal pass through the hole in the insert without being reflected and proceed to be reflected by the water in the open end of the hollow, oblong structure. Electronic means are connected to the signal sending and receiving means. The electronic means are operative to determine and compare the length of time the signal is sent and returned from the insert and from the water. From the comparison of the length of time the signal returns from the insert and from the water, the level of the water may be determined. The hollow, oblong structure may be a tube. The invention may further comprise a means to indicate water depth. These means are operative responsive to the electronic means. The invention may further comprise control means operative to control the device. The control means are operative responsive to the electronic means. The hollow, oblong structure has an opening which is less than 360° around the hollow, oblong structure. The insert is attached in the opening. The outer portion of the insert has the same radius as the outside radius of the tube. The inner portion of the insert has the same radius as the radius of the inside of the tube. The hollow, oblong structure is secured perpendicular to the water, when the level of the water is to be determined. The signal sending and receiving means may be a transducer.

The invention will be more fully understood from the following detailed description and appended claims when taken with the drawing in which:

FIG. 1 is an isometric view of tube 1 with transducer 2 secured thereon.

FIG. 2 is a sectional view taken at section A-A of FIG. 1.

FIG. 3 is a sectional view taken at section B-B of FIG. 1, also showing associated equipment in black box form.

Referring now to the drawings, FIG. 1 shows tube 1. Transducer 2 is secured onto the top of tube 1. Insert 3 is shown secured within tube 1. Tube 1 is cut at opening 12 so that insert 3 may be secured within tube 1 at opening 12.

FIG. 2 shows a sectional view of FIG. 1 at section A-A. This figure shows the insert 3. Hole 4 is within insert 3. Insert 3 is shaped so that it secures within tube 1. Insert 3 is shaped so that the continuity of tube 1 is retained even though a section is removed at opening 12 for the insertion of insert 3.

FIG. 3 is a sectional view at section B-B. FIG. 3 also shows associated equipment in black box form. A signal emanating from electronic circuitry in associated electronics 13 travels through connector 5 through transducer 2 causing ultrasonic signals to emanate from transducer 2 down through tube 1. Some ultrasonic signals such as signal 10 go through hole 4 in insert 3 and are reflected by water level 7 within the bottom opening 6 in tube 1. The reflected signal 11 goes back through the hole 4 in insert 3 and is received by transducer 2. A signal is then sent through connector 5 to electronic receiving circuitry within associated electronics 13. Some signals, such as signal 8, hit insert 3 and are reflected, as reflected signal 9, back toward transducer 2. A signal is then generated through connector 5 to receiving electronics circuitry within associated electronics 13. The signals which are sent and returned may be compared by comparison circuitry in associated electronics 13 to determine the length of time between the signal being sent and received. The signal received from the water is then compared with the time of the signal received from the insert 3 in order to determine the water level. The distance between the transducer 2 and the insert 3 is fixed and is known. This distance may be set at any desired level; however, once it is set, it will remain constant for the insert 3 is physically inserted within tube 1. The associated electronics 13 sends a signal via connector 5 to transducer 2. The electronic signal creates a mechanical reaction within transducer 2 from which an ultrasonic signal emanates through hollow, oblong structure, tube 1. Upon the ultrasonic signal being reflected back to transducer 2, a mechanical change occurs which causes an electronic signal to pass through connector 5 back to associated electronics 13. The associated electronics 13 contains electronic receiving circuitry to receive the signal and electronic transmitting circuitry to transmit the original signal. Further electronic means within associated electronic 13 may include comparison circuitry and circuitry to determine the length of time for the return of the signals which may pass through hole 4 in insert 3 and bounce off the water level 7. The electronic circuitry may determine the length of time for the signal to reflect from insert 3 back to transducer 2 for comparison purposes.

The water depth readout circuitry may be contained in the associated electronics 13 through which a signal may be transmitted along connector 17 to a water depth readout device 15. The water depth readout device may be a recording voltmeter, an electronic counter, or other electronic devices such as DC voltmeters, oscilloscopes, or other graphical or permanent recording devices may be used.

The associated electronics 13 may also contain electronic circuitry to generate signals which would be transmitted through connector 16 to a controlled device 14. The controlled device may be a Weir gate to control the water level flow, valves, AC-DC driven motors, electrical pumps, clorinating devices, alarms, computers, data-link equipment, or any other desired device which can be controlled with the aid of analog or digital signals.

Transducer 2 is an aquatic transducer which might ordinarily be utilized by using the water as the transmitting medium. In the present invention, the air within the hollow, oblong structure, tube 1, is used as the transmitting medium. The water surface is used as the reflective medium along with the reflective insert 3 that is secured within the hollow, oblong structure, tube 1. The transducer 2 may be a transducer such as the Linden P/N 60020 sold by Linden Laboratories, Inc., P. O. Box 360899M, Pittsburgh, Pa. 15230.

Insert 3 is designed so that the outer portion of the insert has the same radius as the outside radius of tube 1. The inner portion of the insert 3 has the same radius as the inside radius of the tube 1. The insert 3 is closely fitted to the opening 12 which has been cut into tube 1 and fits perpendicular to the length of tube 1. Tube 1 may be secured perpendicular to the water 7 when the level of water 7 is to be determined. The opening 12 runs less than 360° around tube 1. Tube 1, therefore, always retains the continuity and strength of a single piece even though there is an opening within. The insertion of the insert 3 into tube 1 further strengthens the tube 1. Insert 3 is inserted tightly and within tube 1 so that no signals could escape through opening 12 around insert 3.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. A device for measuring the level of water comprising:
    a. a hollow, oblong structure with an open end, said structure being secured with said open end in said water;
    b. signal sending and receiving means secured onto said hollow, oblong structure;
    c. an insert, containing a hole, which is secured within said hollow, oblong structure and is operative to reflect a signal from said signal sending and receiving means back to said signal sending and receiving means through said hollow, oblong strucuture and to allow portions of said signal to pass through said hole without being reflected by said insert and to be reflected by said water; and
    d. electronic means connected to said signal sending and receiving means operative to determine and compare the length of time said signal is sent and returned from said insert and from said water
        whereby by the comparison of the length of time said signal returns from said insert and from said water, the level of said water may be determined.

2. A device according to claim 1 wherein said hollow, oblong structure is a tube.

3. A device according to claim 1 further comprising means to indicate water depth, said means being operative responsive to said electronic means.

4. A device according to claim 1 further comprising control means operative to control a device, said control means operative responsive to said electronic means.

5. A device according to claim 1 wherein said hollow, oblong structure has an opening which is less than 360° around the hollow, oblong structure in which said insert is attached.

6. A device according to claim 2 wherein said hollow, oblong structure has an opening which is less than 360° around the hollow, oblong structure in which said insert is attached.

7. A device according to claim 6 wherein the outer portion of said insert has the same radius as the outside radius of said tube.

8. A device according to claim 7 wherein the inner portion of said insert has the same radius as the inside radius of said tube.

9. A device according to claim 1 wherein the hollow, oblong structure is secured perpendicular to said water, when the level of said water is to be determined.

10. A device according to claim 1 wherein said signal sending and receiving means is a transducer.

* * * * *